Nov. 23, 1926.
W. E. HOLLAND ET AL
1,608,315
STORAGE BATTERY PLATE
Filed July 21, 1922     2 Sheets-Sheet 1
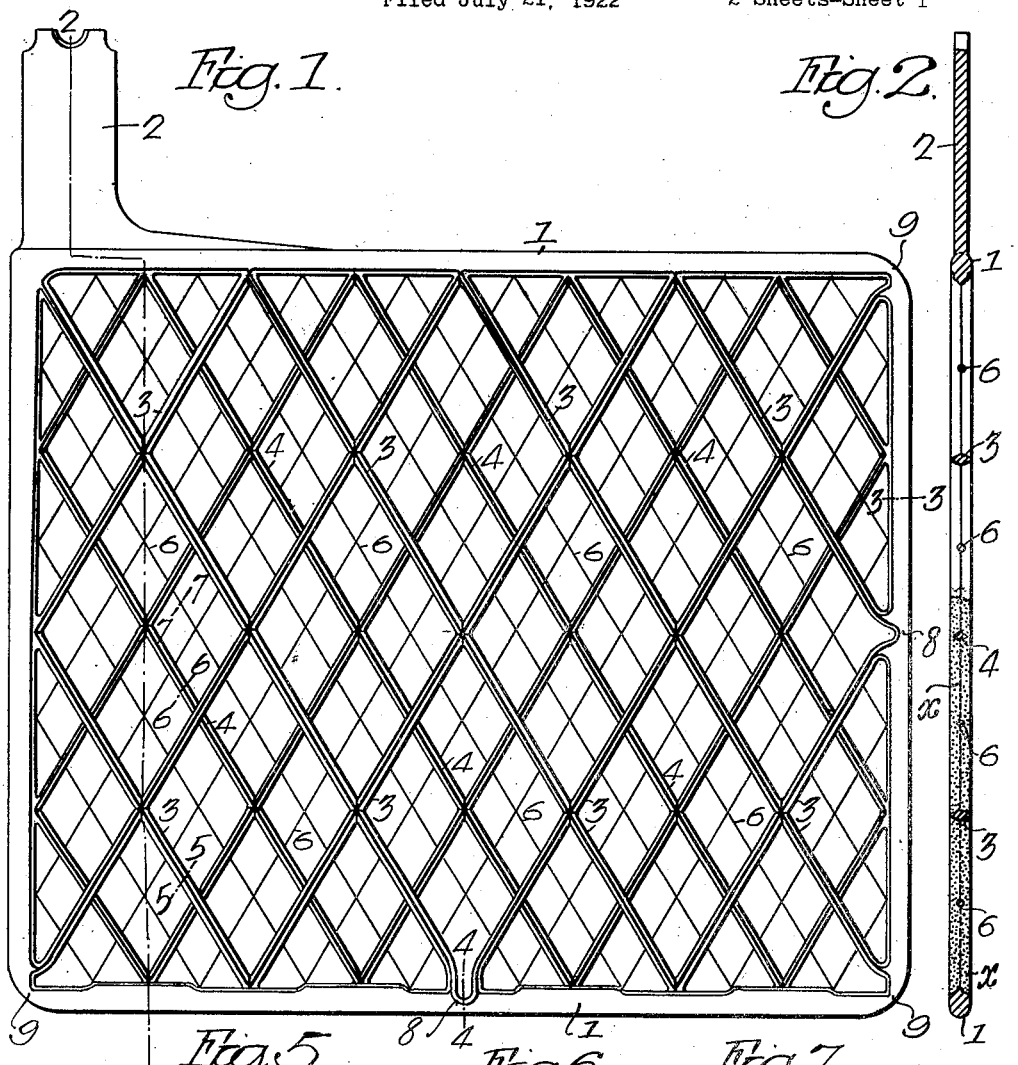
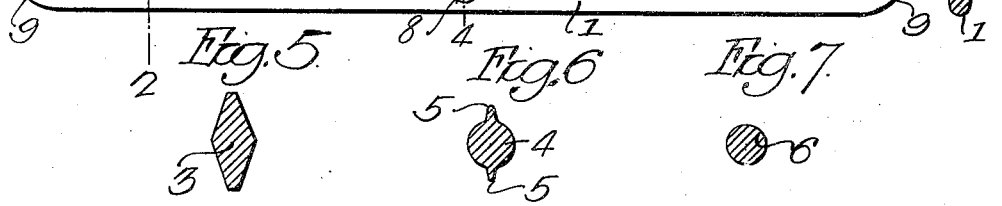
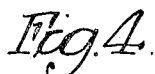
Inventors.
Walter E. Holland.
James M. Skinner.
by their Attorneys.
Howson & Howson

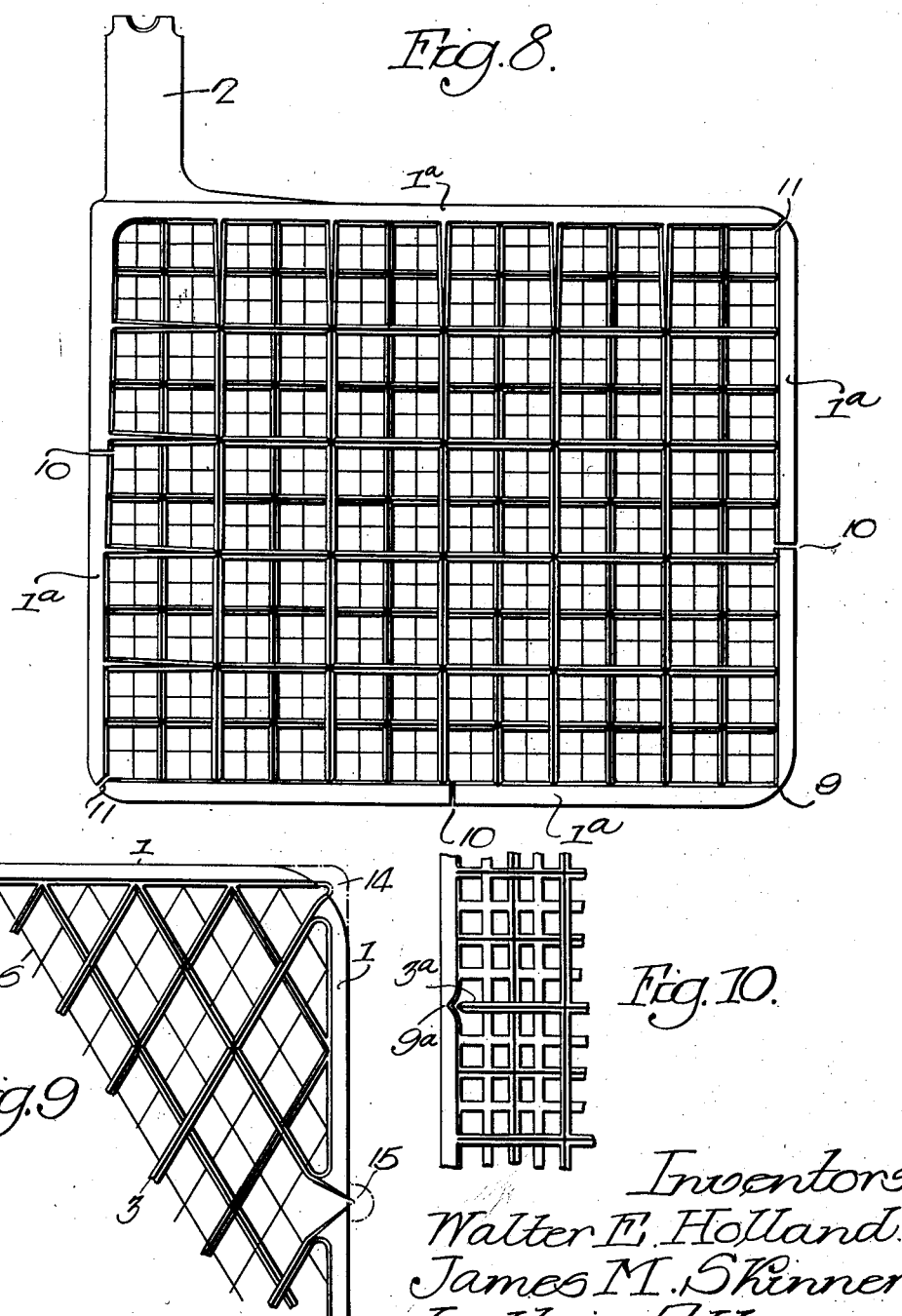

Patented Nov. 23, 1926.

1,608,315

UNITED STATES PATENT OFFICE.

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE-BATTERY PLATE.

Application filed July 21, 1922. Serial No. 576,535.

As a result of investigation and experiment we have found that the buckling of storage battery plates as ordinarily constructed is in a large measure due to expansive stress along the plane of the plate tending to increase its width and height and to the resistance to this lateral stress offered by the relatively heavy bounding frame of said plate.

An object of this invention is to provide a novel form of battery plate which shall include a grid having frame members structurally weakened, by reducing their cross section or cutting them at predetermined points in such manner as to permit of relative movement of the frame segments thus formed when expansive stresses are set up along the plane of the plate, with a view to relieving said stresses and thus preventing buckling of the plate and the harmful consequences thereof.

Another object of our invention is to provide a plate including a grid having rib members formed and arranged in a novel manner with a view to better protecting them from electro-chemical action and increasing the proportion of surface active material held by said grid, while at the same time giving ample support to the active material.

A further object of the invention is to provide an improved battery plate which, while having greater capacity by reason of its increased proportion of surface active material, will impart to the battery in which it is used a longer useful life, owing to the protection afforded the active material and to the separators by the aforesaid non-buckling grid construction.

These objects and other advantageous ends we attain as hereinafter set forth, reference being had to the accompanying drawings, in which, Fig. 1 is an elevation of a storage battery grid constructed in accordance with our invention;

Fig. 2 is a vertical section on the line 2—2, Fig. 1, showing active material applied to a portion of the grid in the manner characteristic of the finished battery plate;

Figs. 3 to 7 inclusive are transverse sections on the lines 3—3, 4—4, 5—5, 6—6 and 7—7 respectively, all of these last figures being on a scale larger than that of Figs. 1 and 2;

Fig. 8 is an elevation of a grid illustrating a modified form of our invention; and Figs. 9 and 10 are fragmentary elevations illustrating special forms of our invention.

In Figs. 1 to 7 of the above drawings, 1—1 represents the main or marginal frame of a grid constructed in accordance with our invention, and in the present instance this frame is substantially rectangular in outline, having the cross sectional form illustrated in Fig. 3 and being provided adjacent one corner with a projecting terminal lug 2.

Mounted integrally within this main frame are two series of relatively heavy diagonal members 3—3 of which those of each series are parallel and intersect those of the other series. These main diagonal members have the approximate diamond cross-sectional form shown in Fig. 5, and, as illustrated in Fig. 2, have a thickness substantially equal to that of the marginal frame 1.

Intermediate each pair of parallel members 3 is a lighter diagonal member 4 having the generally circular section illustrated in detail in Fig. 6, but including relatively narrow ribs 5 projecting toward though stopping a little short of, the planes defined by the two faces of the marginal frame members 1—1.

Between each of the main diagonal members 3 and the adjacent intermediate diagonal member 4, is a third form of member 6 having preferably the circular section illustrated in Fig. 7 and in diameter approximately one third to one half the thickness of the main frame members 1—1. These minor frame members 6 are preferably positioned in the central plane of the grid so that they are spaced away and substantially equi-distant from the planes of its two faces.

Obviously the minor frame members 6 are completely and deeply imbedded in the active material $x$ (Fig. 2) where the acid electrolyte does not have free access to them, so that they are not electro-chemically acted on to as great an extent as are the exposed members in grids of conventional design and consequently they may either be made lighter or, if made of the same size, will stand a greater amount of electrochemical action without becoming seriously weakened. The same is true to a great extent as regards the intermediate frame members 4 which, while being for the most part likewise imbedded in and largely protected by the active material, include the narrow fin-like ribs 5 for assisting in holding the active material in place.

The diagonal members 3 constituting the main supporting structure within the grid frame also present a minimum of their surface at and adjacent the outer surfaces of the active material with which, in the finished plate, they are for the most part surrounded, so that under conditions of use, higher capacity is obtained from a given weight plate embodying this improved grid, as a result of the greater proportion of active material at and immediately adjacent the plate surfaces where the electrolyte has better access to it.

In order to prevent the warping or buckling of the plates under lateral expansive stresses, we weaken the main marginal frame at certain points, as indicated at 8—8. The location of these points may vary, depending on the type and size of grid and in the present case they are approximately at the middle of its two sides most distant from the terminal lug 2 and also at points 9—9 at its three corners away from said lug. As a consequence of this construction said marginal frame will open or yield at these weakened points to relieve expansive stresses so that under conditions of use the plate will remain flat and will not tend to cut or wear through the separators or to cause fracture or loosening of the active material by buckling.

Without departing from our invention we may carry the weakening of the marginal members to the extent of cutting them through, or forming gaps in them, as indicated at 10—10 in Fig. 8, these gaps in the case illustrated being at or adjacent the middle portions of the marginal members 1ª—1ª and also at one or more of the corners as indicated at 11. In any case the marginal frame is locally weakened at predetermined points to permit it to yield laterally under expansive stresses such as occur under operating conditions.

In order to provide the cut or weakened portions with a minimum of expense we may cast the grids with portions 14 and 15 (Fig. 9) which are removed by the trimming operation to which said grids are subjected, so that as a result the frame members are thereby given the desired construction without additional operations. If desired the marginal frame members may be weakened at any desired points by being made as shown in Fig. 10 where it is internally notched or recessed as at 9ª and the adjacent rib member 3ª is extended toward but is spaced away from it.

We claim:

1. A battery plate structure comprising an open grid having a marginal frame, said frame comprising means providing for unrestricted bi-dimensional expansion in the plane of the frame.

2. A grid for a battery plate comprising a marginal frame made up of a plurality of structurally independent parts and intra-marginal members connecting said parts.

3. A grid for a battery plate comprising a substantially rectangular marginal frame having structurally weak portions adjacent corners adapted to rupture under expansion strains to permit free bi-dimensional expansion of the frame.

4. A grid for a battery plate comprising a substantially rectangular marginal frame having structurally weak portions adjacent corners and at predetermined points in the sides adapted to rupture under expansion strains to permit free bi-dimensional expansion of the frame.

5. A grid for a battery plate comprising a marginal frame and a terminal lug; said frame having structurally weak portions at points other than in proximity to said lug adapted to rupture under expansion strains to permit free bi-dimensional expansion of the frame.

6. A battery plate including a grid having a marginal frame with localized portions of reduced cross section adapted to rupture under expansion strains to permit free bi-dimensional expansion of the frame.

7. A storage battery grid consisting of a marginal frame, and main rib members extending between the elements of said frame and having substantially the same thickness as said elements; with auxiliary rib members of materially less thickness transversely of the grid than said main rib members and positioned to lie between but removed from the two planes defining the faces of the grid, said auxiliary rib members including longitudinally extending fins projecting toward said plane.

8. A grid for a battery plate comprising main ribs and intersecting auxiliary ribs of substantially circular section lying between and removed from the planes defined by the opposite faces of said main ribs.

9. A battery plate including a grid having a marginal frame; main rib members within said frame extending to the surface of said plate; intermediate ribs lying below the surface of said plate; and minor ribs lying still further below the surface of said plate.

10. A battery plate including a grid having a marginal frame; intersecting major ribs of substantially diamond shape cross-section; and intermediate minor ribs of substantially circular cross section lying below the surface of said plate.

11. A grid for a battery plate consisting of a marginal frame; with intersecting main frame members extending between the elements of said marginal frame, said marginal frame including portions locally reduced in cross section adapted to rupture under expansion strains to permit free bi-dimensional expansion of the frame.

12. A storage battery plate comprising a grid having a marginal frame and ribs connecting the elements of said frame having different thicknesses transversely of the grid and lying between the planes of the faces of said frame.

13. A storage battery plate comprising a grid consisting of a marginal frame and ribs connecting the elements of said frame having different thicknesses transversely of the grid, a majority of said ribs being spaced away from the faces of the plate.

14. A grid for a battery plate comprising a relatively weak marginal frame having localized portions of reduced cross section adapted to rupture under expansion strains to permit free bi-dimensional expansion of the frame, and relatively stiff frame members connecting parts of said marginal frame.

WALTER E. HOLLAND.
JAMES M. SKINNER.